INVENTOR.
VICTOR E. ALTHOUSE
BY
ATTORNEYS

United States Patent Office 3,677,875
Patented July 18, 1972

3,677,875
METHOD AND MEANS OF DIE MATRIX EXPANSION
Victor E. Althouse, Los Altos, Calif., assignor to Raychem Corporation, Menlo Park, Calif.
Filed Aug. 19, 1970, Ser. No. 65,188
Int. Cl. B32b 3/00
U.S. Cl. 161—117                               15 Claims

ABSTRACT OF THE DISCLOSURE

A method and means of handling and separating small, fragile objects such as "dice" bearing miniaturized electronic circuitry, one from the other. Such dice or other objects rest upon and preferably are transiently adhered to the surface of a foam expansible plastic article which is subsequently expanded to enlarge the interstices between individual dice so that the dice can be conveniently picked up by, e.g., vacuum or tweezer techniques. A wafer having fault lines therein defining dice can be applied to the surface and cracked along the fault lines to form interstices between the dice. Alternatively, the wafer can be first cracked along the fault lines to form an assembly of dice having interstices therebetween, which assembly can then be transferred to the foam expansible surface for expansive enlargement of the interstices or conversely the wafer may be placed on the surface before the fault lines are formed. Preferably the foam expansible plastic is a cross-linked polymer, most preferably one which is tacky during the expansion process so as transiently to adhere the dice to the expansible plastic article. Alternatively, that transient adhesion can be secured where desired by the use of a light adhesive.

BACKGROUND OF THE INVENTION

Figure 1:
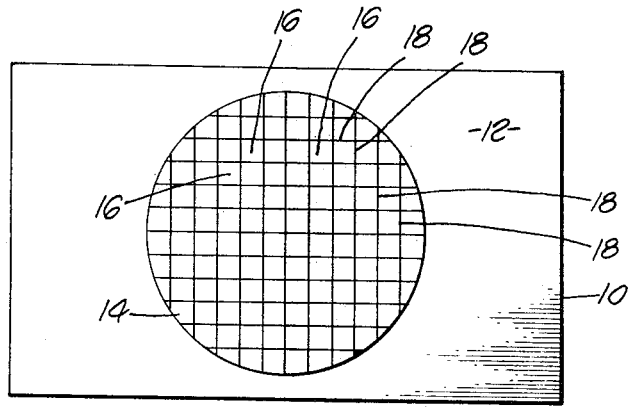

Developments in the electronics industry in recent years have resulted in spectacular reductions in size owing to the replacement of thermionic valves by transistors. Following this jump in miniaturization, the manufacture of integrated circuits in which a number of electronic components of various functions are formed on an integral piece of material has progressed from processes in which each such circuit was individually formed to processes in which a large number of such circuits, which may or may not be identical, are simultaneously formed and subsequently separated in a manner akin to the manufacture of sheets of stamps, which latter are first printed and then perforated to render the individual stamps separable one from another. Of course, the simultaneous production and subsequent separation of a plurality of integrated circuits proceeds on a much smaller scale.

Generally, the circuit-containing units—herein referred to as "dice"—are formed on a frangible preferably semi-conductive or semiconductive-coated sheet—herein termed a "wafer"—and the individual dice defined by fault lines scribed or otherwise formed in the wafer. The individual dice are freed from the wafer configuration by "cracking" along the fault lines defining the dice, which latter are preferably formed by scribing with a diamond cutter. Most commonly, cracking is effected by manually running a roller over the surface of the wafer. This operation tends to leave each separated die contiguous to its neighbors. Removal or sorting the dice from this state must be carried out with great care, otherwise some dice will be turned upside down, others disoriented, and still others lost. Generally, the wafers employed are circular and following cracking the fragments having curved boundaries (i.e., those resulting from scribed lands along the periphery of the circular wafer) discarded. Where the sorting or removal operation disorganizes the cracked fragments, manifestly separation of the dice from fragments to be discarded is made more difficult. Moreover, when differing circuits are formed on individual dice within the same wafer, disorganization of the dice renders location and separation of particular circuit-containing dice more difficult. This problem is particularly aggravated by the miniscule size of the individual dice, several hundred or thousand individual dice commonly being formed from a single wafer having a diameter of five or eight centimeters.

It has previously been proposed to overcome the foregoing problems by pressing the wafer, which may or may not be scribed, onto a disc of heated plastic film. If necessary, the wafer may then be scribed and in any case is then rolled to crack the same along fault lines defining the individual dice. The film is then clamped at its margins and placed over a heated piston which when raised stretches the film, thus separating the dice. The film can be secured to the piston and the broken wafer then transported on the film-covered piston to the next manufacturing stage. This process suffers from the disadvantage that expensive apparatus is required and the piston and clamping mechanism are rendered unavailable for reemployment until such time as the dice carried by the stretched film have been transferred to the next processing stage. Also, the clamped system is bulky and awkward to store.

BRIEF SUMMARY OF THE INVENTION

According to this invention there are provided method and means for spacing dice one from another by applying an assembly of dice having interstices therebetween to the surface of a foam-expansible plastic article and foam expanding the article, whereupon the area of the surface increases and the interstices between the dice are enlarged for subsequent, facile pickup. Alternatively, by this invention, there may be applied to the surface of the expansible plastic article a wafer having fault lines therein which define the dice, followed by cracking of the wafer along the fault lines to form an assembly of dice having interstices therebetween, and then foam expanding the article as related hereinabove. Conversely, the fault lines may be scribed when the wafer is on the article.

One object of the instant invention is to provide a straightforward, economical method of separating dice from an assembly thereof or from a wafer.

A further object of the invention is to provide means for separating the dice from an assembly thereof or a wafer and storage of the separated dice without resort to complex or expensive apparatus.

Figure 2:
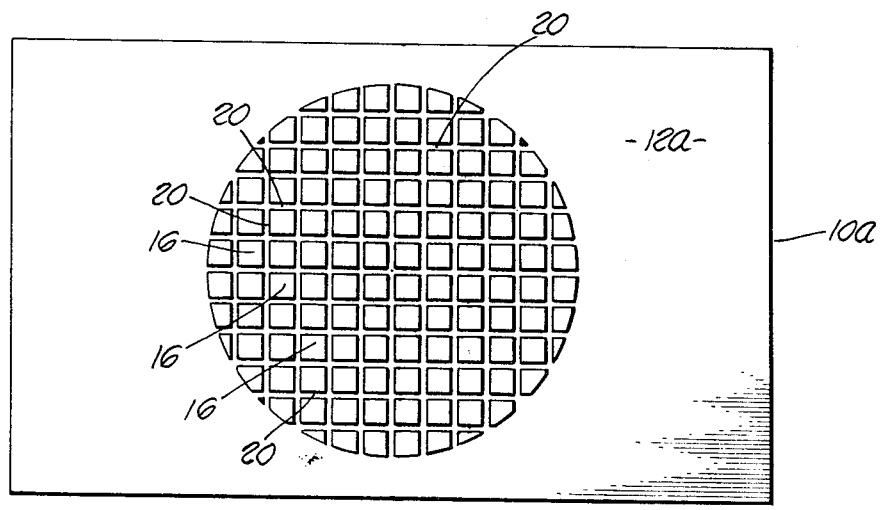

These and other objects of the invention will become apparent from the more detailed description which follows, and from the accompanying drawing (not to scale) in which:

FIG. 1 is a plan view of a foam expansible plastic article having applied thereto a wafer having fault lines therein defining individual dice; and FIG. 2 is a plan view of the article of FIG. 1 after foam expansion.

DETAILED DESCRIPTION OF THE INVENTION

With reference now to FIG. 1, there is illustrated a foam expansible plastic block indicated generally by the reference numeral 10 and having an upper surface 12 to which is applied a wafer 14 having fault lines 18 formed therein to define a plurality of dice 16. A roller (not shown) can be manually or otherwise passed across the surface of the wafer 14, whereupon the wafer is cracked along the fault lines 18 to free the individual dice 16 one from the other, leaving interstices therebetween. Following cracking, each die is left in its original position so that the cracked wafer generally resembles that shown in FIG. 1 save only that the fault lines 18 have become interstices between the individual dice.

FIG. 2 illustrates the article of FIG. 1 after expansion, as by heating, of the foam expansible plastic block 10 to form an expanded foamed block generally indicated by the reference numeral 10a. As can be seen, the surface 12 has expanded to form the surface 12a, the center of each die 16 retaining approximately the same position on the enlarged scale of the new surface. As the dice 16 do not expand, however, the edges of adjacent dice are no longer contiguous. Instead, the interstices have enlarged, preferably inessentially uniform fashion, so that the dice 16 while retaining their original organization can be easily removed from the surface 12a by tweezers, vacuum, etc. Generally, the non-rectilinearly bounded fragments are discarded, and it will be apparent from FIG. 2 that the retained organization of the freed dice on the expanded block makes that separation and discard relatively easy to effect. If any pair of dice are not properly divided by the scribing and cracking operations, such a condition will be readily apparent at this stage.

Of course, it is not necessary that cracking of the scribed wafer be effected after the wafer has been applied to the expandible block. Instead, for example, the wafer can be held against a porous or perforate transient substrate by vacuum during cracking, then neatly transferred to the expansible block simply by inverting the transient substrate over the expansible block and releasing the vacuum, whereupon the cracked wafer is released to the expansible substrate. In the event that the individual dice bear circuitry on but one side thereof, it may be preferable to ensure that the circuit-containing side of the dice is opposite that presented to the expansible block, particularly in the instance where a light adhesive is employed to render the dice transiently adhered to the expansible block, where the block is comprised of a polymer tacky at the temperature of operation of the same end, etc.

For a number of reasons, it is preferable that the scribed wafer or assembly of freed dice resulting from the cracking thereof be transiently adherable to the expansible block. For example, where a scribed wafer is cracked while positioned on the expansible block, that transient adhesion prevents roller pickup or disorganization of the freed dice. Rolling is most conveniently effected at room temperature, although it need not be, so that preferably the wafer and freed dice resulting from cracking are transiently adherable to the surface of the expansible block at room temperature. That goal can be achieved simply by employing an expansible block comprised of a polymer which is tacky at room temperature, and room temperature tackiness has the added advantage that the expanded block can be handled without undue fear of prematurely dislodging the freed dice therefrom. Of course, in lieu of providing that the expansible block be comprised of a tacky polymer, transient adhesion can be attained simply by applying to the surface of the expansible block a thin coating of a suitable adhesive, such as a hot-melt wax, or by otherwise coating the expansible block to render it tacky at a desired temperature. Alternatively or in addition to providing for room temperature tackiness, the block can be provided or treated to ensure transient adhesion of the assembly of dice formed by cracking the wafer at elevated temperatures up to and preferably including the temperature at which expansion is had. Thus, for example, the block may be comprised of a polymer which becomes tacky at a temperature between room temperature and the temperature of expansion such that upon expansion the freed dice are carried with the expanding polymer surface and hence away from adjoining dice. Of course, the light weight nature of the individual dice generally ensures that movement upon expansion in any case. As used herein, transient adhesion refers to that adhesion of the dice to the plastic surface upon which they are disposed which resists roller pickup or disorganization, resists sliding or tumbling relative to the block upon which they are disposed when the same is inclined at a substantial angle, yet admits of facile removal by vacuum or tweezer techniques.

In any given instance, the optimal temperature of expansion is chosen upon consideration of the temperature resistance of the various components of the system, the activation temperature of the particular foaming agent and the quantity thereof incorporated in the expansible block, tackiness of the plastic surface desired, etc. Generally, temperatures of expansion can range from about 30° C. to about 350° C., and preferably from about 75° C. to about 250° C.

As opposed to a film, the article presenting the expansible surface is preferably monolithic in configuration, e.g., a rectangular block, for ease of handling. The expansible article is, of course, predominantly comprised of plastic material and contains a minor proportion of a suitable foaming agent, preferably heat-activated. As suitable candidates for employment with this invention, there may be mentioned the following foaming agents:

azodicarbonamide
azobis isobutyronitrile
diazoaminobenzene
N,N'-dinitrosopentamethylene tetramine
4,4'-oxybis(benzene sulphonyl hydrazide)
heptane
dichloroethane Those skilled in the art are well-enabled to determine optimal proportions of the foaming agents depending upon the degree of expansion desired. Generally speaking, foaming agents are proportioned to obtain an expansion in area ranging from about 1.2× to about 3×, based upon the length and width of the unexpanded plastic article.

The wafers employed are of frangible, preferably semi-conductive or semi-conductive-coated material such as silicon, the preferred material. Suitable alternative candidates for wafer employment include germanium and gallium arsenide.

Of course, a plurality of wafers may be applied to a single expansible block and similarly, a plurality of wafers may be applied to a single expansible plastic article, after cracking or before scribing.

In principle, any polymer capable of being expanded by foaming agents can be employed in the present invention. As mentioned above, however, those materials are preferred which become somewhat tacky at the elevated temperatures experienced in operation according to the invention. As examples of preferred materials, there may be mentioned copolymers of ethylene with other unsaturated monomers, such as vinyl acetate and ethyl acrylate. Generally, in such copolymers, ethylene predominates while the other comonomer is present in proportions of from about 1% to about 25% by weight. Other suitable polymers include polyethylene, polyvinyl chloride, ionomers (for example Surlyns—a trademark of E. I. du Pont de Nemours & Co. for their ethylene-acrylic acid based materials) and polyurethane.

The polymer may be, and advantageously is, cross-linked by irradiation although chemical means such as peroxides can be employed to the same end. Two major advantages are secured by judicious crosslinking: first, the polymer is rendered resistant to melting at the temperatures experienced during the expansion operation and will expand in a predictable fashion without the necessity of a mold; second, crosslinking ensures that upon foaming the surface of the article upon which the dice are disposed will remain continuous or integral, i.e., the cells formed by foaming do not penetrate and texture the surface. Thereby, the possibly that such texturing due to foaming through the surface would disorient the dice disposed thereon is avoided. The degree of crosslinking should be less than that which would result in significantly restraining expansion upon foaming. In general, crosslinking equivalent to an irradiation dose of up to about 10 Mrad or, in the case of chemical crosslinking, sufficient to give a gel content of not more than about 90% will be suitable.

Example

The following composition was blended and formed into a slab at 120° C.:

| | Parts by weight |
|---|---|
| Ethylene-vinyl acetate copolymer (18% vinyl acetate) | 100 |
| Zinc stearate | 0.5 |
| Silicon dioxide (Cab-O-Sil) | 1.0 |
| Azodicarbonamide | 5.0 |

The slab of thickness 2.54 mm. was crosslinked by an irradiation dose of 5 Mrad from each side. A 50 mm. diameter silicon wafer, previously scribed and cracked, was placed on the surface of the slab and the slab transferred to a 200° C. oven. After approximately 5 minutes it was removed. The wafer had expanded to about 75 mm. in diameter and each die was separated from its neighbor, all the dice maintaining their initial relative positions and orientations. The slab had expanded in thickness to about 2.8 mm.

I claim:

1. A method for spacing dice one from another which comprises applying an assembly of dice having interstices therebetween to the surface of a foam expansible plastic article and foam expanding said article to cause the area of said surface to increase whereby the said interstices between said dice are enlarged.

2. The method of claim 1 wherein said assembly is constituted by a wafer cracked along fault lines defining said dice to form said interstices.

3. The method of claim 1 wherein said wafer is a silicon wafer scribed prior to cracking to form said fault lines.

4. The method of claim 3 wherein said article is comprised of a crosslinked polymer.

5. A method for spacing dice one from the other which comprises applying to the surface of a foam expansible plastic article a wafer having fault lines therein which define dice, cracking the said wafer along said fault lines to form interstices between said dice, and foam expanding said article to cause the area of said surface to increase whereby the said interstices between said dice are enlarged.

6. The method of claim 5 wherein said wafer is transiently adhered to said surface prior to the cracking step.

7. The method of claim 5 wherein said dice are transiently adhered to said surface after said cracking step but prior to the foam expansion step.

8. The method of claim 5 wherein said wafer is a silicon wafer scribed prior to application to said surface to form said fault lines.

9. The method of claim 8 wherein said article is comprised of a crosslinked polymer.

10. The method of claim 1 wherein said surface is the surface of a foamable crosslinked ethylene copolymer tacky at the temperature at which foam expansion occurs such that said dice are transiently adhered thereto.

11. The method of claim 10 wherein said copolymer is tacky at room temperature such that said dice are transiently adhered thereto.

12. The method of claim 6 wherein said surface is the surface of a foamable crosslinked ethylene copolymer tacky at the temperature at which foam expansion occurs such that said dice are transiently adhered thereto.

13. The method of claim 5 wherein said surface is the surface of a foamable crosslinked ethylene copolymer tacky at room temperature whereby said wafer is transiently adhered thereto.

14. Means for spacing dice one from another which comprises a foam expansible plastic article having transiently adhered to a surface thereof a wafer having fault lines therein which define dice.

15. Means for spacing dice one from the other which comprises a foam expansible plastic article having transiently adhered to a surface thereof a wafer cracked along fault lines therein to form an assembly of dice having interstices therebetween.

References Cited

UNITED STATES PATENTS

| 3,461,537 | 8/1969 | Lotz | 29—413 |
| 3,537,169 | 11/1970 | Eigeman et al. | 29—413 |
| 3,559,855 | 2/1971 | Barnett et al. | 29—413 |
| 3,562,057 | 2/1971 | McAlister et al. | 29—583 |

WILLIAM J. VAN BALEN, Primary Examiner

U.S. Cl. X.R.

29—413, 582, 583; 53—21 R; 156—79, 297; 161—159, 162